United States Patent
Jaladi et al.

(10) Patent No.: US 10,671,378 B2
(45) Date of Patent: Jun. 2, 2020

(54) UPDATING PARTICULAR FEATURES IN AN APPLICATION

(71) Applicant: PAYPAL, INC., San Jose, CA (US)

(72) Inventors: Kishore Jaladi, Campbell, CA (US); Darshan Desai, Fremont, CA (US)

(73) Assignee: PAYPAL, INC., San Jose, CA (US)

( * ) Notice: Subject to any disclaimer, the term of this patent is extended or adjusted under 35 U.S.C. 154(b) by 119 days.

(21) Appl. No.: 15/396,244

(22) Filed: Dec. 30, 2016

(65) Prior Publication Data

US 2018/0189047 A1    Jul. 5, 2018

(51) Int. Cl.
*G06F 9/445*     (2018.01)
*G06F 8/658*     (2018.01)

(52) U.S. Cl.
CPC .................... *G06F 8/658* (2018.02)

(58) Field of Classification Search
CPC ...... G06F 8/65; G06F 21/57; G06F 17/30129; G06F 17/30876; G06F 17/30879; H04W 8/245
USPC ......................................................... 717/173
See application file for complete search history.

(56) References Cited

U.S. PATENT DOCUMENTS

| | | | |
|---|---|---|---|
| 9,489,190 B1* | 11/2016 | Wang et al. | G06F 9/45508 |
| 9,753,618 B1* | 9/2017 | Jain et al. | G06F 3/14 |
| 2006/0052962 A1* | 3/2006 | Shipton et al. | G06F 21/57 702/106 |
| 2015/0378714 A1* | 12/2015 | Katariya et al. | G06F 8/65 717/170 |
| 2018/0131574 A1* | 5/2018 | Jacobs et al. | G06F 8/65 |

* cited by examiner

*Primary Examiner* — Qing Chen
*Assistant Examiner* — Mohammed N Huda
(74) *Attorney, Agent, or Firm* — Haynes and Boone, LLP

(57) ABSTRACT

A system is configured to perform operations that include determining a first set of modular features corresponding to a first version of a service provider application and a second set of modular features corresponding to a second version of the service provider application. An original version of the service provider application may have been downloaded from an application store. The operations further include identifying, based on a comparison between the first set of modular features and the second set of modular features, a new set of modular features. The operations also include applying the new set of modular features to the first version of the service provider application. The applying may be based on determining that the new set of modular features supports predefined interface templates and corresponding interpreters. As such, the operations may be performed without communicating with the application store.

20 Claims, 8 Drawing Sheets

UPDATING PARTICULAR FEATURES IN AN APPLICATION

BACKGROUND

Mobile devices currently store various applications used to perform and/or accomplish various tasks. Such applications may be periodically updated as different features are rolled out. A particular application may typically be updated by downloading an entire new version of the particular application from an application store. The applications store may enforce various rules, regulations, or other types of restrictions on applications that are stored or downloaded from the application store. Applicants recognize that an effect of use restrictions may be that updating certain features of the particular application may be relatively inefficient or cumbersome.

Figure 1:
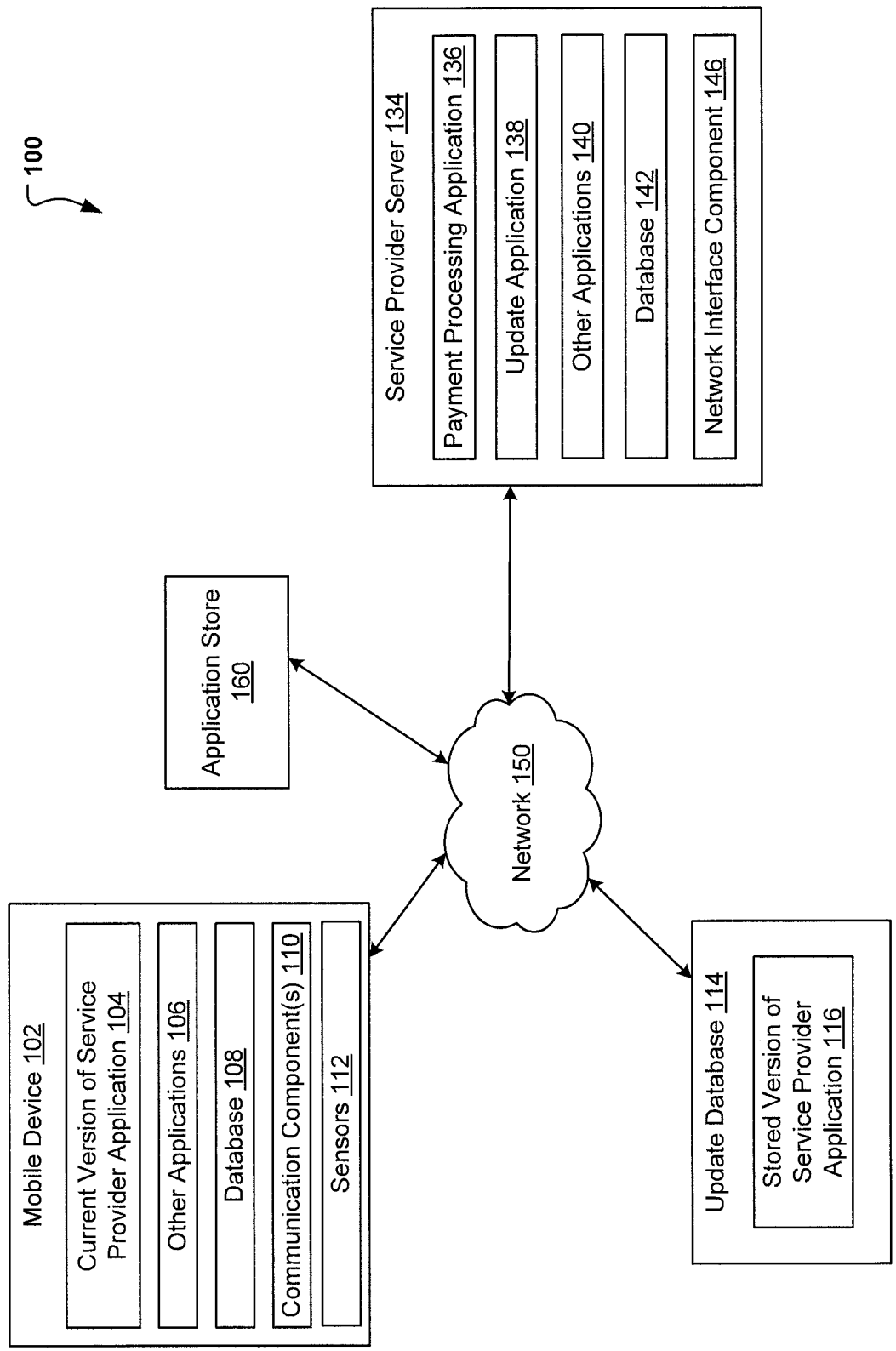
FIG. 1 is a block diagram of a networked system suitable for implementing the processes described herein for updating user interface features in an application, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Systems and methods are provided for updating particular features of a service provider application (SPA) that is stored on a mobile device of a user. The SPA stored on the mobile device may be associated with various "versions." As used herein, an "original version" of the SPA stored on the mobile device may refer to a version of the SPA that was downloaded, by the mobile device, from an application store such as Apple's App Store®, Google's Play Store®, and/or the like. A "current version" of the SPA stored on the mobile device may refer to a version of the SPA that is currently stored on the mobile device. A "previous version" of the SPA may refer to a version of the SPA that was stored on the mobile device prior to the current version of the SPA being stored on the mobile device. Thus, in some instances, the original version of the SPA may correspond to the current version or to a previous version of the SPA, depending on when the SPA was downloaded from the application store.

According to certain embodiments, the current version of the SPA (e.g., a version of the SPA that is currently active on the mobile device) may determine an update event that indicates the current version of the SPA is to be updated to a different version of the SPA. For example, determining the update event may include receiving an input from the user that indicates the user has made an affirmative selection to update the SPA. As another example, determining the update event may occur as a result of initializing the current version of the SPA, which may be configured to automatically check for an update (e.g., via communication with a service provider server) during initialization or in response to initialization.

In response to determining the update event, the SPA may access a database that stores a stored version of the service application. As used herein, a "stored version" of the SPA may refer to a version of the SPA that is stored in the accessed database, or at another location that may be identified using the accessed database. In some implementations, the SPA may access the database directly while in other implementations, the SPA may communicate with a service provider server and cause the service provider server to access the database.

The stored version of the SPA may be compared (e.g., the SPA and/or the service provider may perform the comparison) with the current version of the SPA to determine whether there are any differences between the stored version and the current version of the SPA. If there are certain differences between the current version and the stored version of the SPA, a determination may be made that the SPA is to be updated. For instance, comparing the current version with the stored version may include comparing respective structure metadata of the current version and the stored version of the SPA. If the structure metadata of the current version of the SPA is different from the structure metadata of the stored version of the SPA, then it may be determined that the SPA is to be updated. In other implementations, the current version of the SPA may be associated with a first validation value (e.g., a checksum value, a hash value, a version number, and/or the like), and the stored version of the SPA may be associated with a second validation value. If the first validation value is different from the second validation value, the SPA or the server may determine that an update is to be performed with respect to the current version of the SPA stored on the mobile device. In some embodiments, determining whether differences between versions exist may include analyzing metadata or other information about the stored version of the SPA.

Furthermore, the current version of the SPA may be associated with first structure metadata that indicates a first set of features, and the stored version of the SPA may be associated with second structure metadata that indicates a second set of features. The first set of features and the second set of features may be compared to determine a new set of features. For example, the first structure metadata and the second structure metadata may be compared to determine new structure metadata that indicates the new set of features. In some cases, determining the new structure metadata may include generating the new structure metadata. The new set of features may include features that are included in the second set of features but not included in the first set of features. Thus, the new set of features may represent the difference between the first and second set of features.

According to one or more embodiments, the new set of features may be applied to the current version of the SPA without requiring an update of the entire current version of the SPA. For example, the SPA may determine, based on the new structure metadata, that the new set of features correspond to one or more predefined interface templates. In response to this determination, the new set of features may be applied to the current version of the SPA without communicating with the application store from which the original version of the SPA was received (e.g., downloaded). Thus, the new set of features may be applied without having to download (from the application store) an entirely new version of the SPA to replace the current version of the SPA stored on the mobile device. In some embodiments, the new set of features may be applied based on information downloaded from a different location from which the original version of the SPA was received (e.g., a second database that is different from a first database storing the original version and/or current versions of the SPA are available). The set of features that result from applying the new set of features to the current version of the SPA may be the same as the second set of features associated with the stored version of the SPA in the database.

In other embodiments, the SPA may determine, based on the new structure metadata, that the new set of features does not correspond to any of the one or more predefined interface templates. In response to this determination, the stored version of the SPA may be downloaded from the application store. Thus, according to a particular embodiment, in order for the new set of features to be applied to the current version of the SPA without communicating with the application store, the new set of features may have to correspond to one or more of the predefined interface templates. Furthermore, according to one or more particular embodiments, the SPA may include an interpreter that is configured to determine whether structure metadata (e.g., the first structure metadata, the second structure metadata, and/or the new structure metadata) corresponds to one or more of the predefined interface templates.

It will be appreciated that as used herein "features" (e.g., the features included in the first set, new set, and/or second set of features) may be modular features that include various modular components that do not affect a core functionality of the SPA. For example, in some cases these modular features may be modified (e.g., added, removed, replaced, and/or the like) without affecting the ability of the SPA to operate at a particular level of functionality. For example, if the SPA is a payment application, such features may be modified without affecting the ability of the SPA to process payment transactions.

As previously discussed, the features may correspond to one or more predefined interface templates. The predefined interface templates may specify various UI elements including, but not limited to, input elements, display elements, display element layouts, and/or other types of UI characteristics. In certain implementations, the predefined interface templates may include display elements that correspond to legal notices that are displayed to the user during execution of the SPA. For example, the SPA may be configured to display a legal notice in response to initializing the SPA. In some cases, the language included in such legal notices may be changed (e.g., so as to correspond to changing law, regulations, and/or various business or legal reasons). Rather than downloading an entirely new version of the SPA from the application store in order to incorporate the changed legal notice, display elements corresponding to the legal notice may be transmitted to the mobile device and applied to the current version of the SPA.

In other implementations, predefined interface templates may include display characteristics of buttons, radials, banners, colors, and/or other types of UI elements. For example, the second set of features corresponding to the stored version of the SPA in the database may be associated with different layout of a particular button than the first set of features associated with the current version of the SPA on the mobile device.

FIG. 1 is a block diagram of a networked system 100 for implementing the processes described herein, according to an embodiment. As shown, system 100 may include or implement a plurality of devices, computers, servers, and/or software components that operate to perform various methodologies in accordance with the described embodiments. Example devices, computers, and servers may include mobile devices, wearable devices, stand-alone devices, desktop computers, laptop computers, and enterprise-class servers, executing an operating system (OS) such as a MICROSOFT® OS, a UNIX® OS, a LINUX® OS, or another suitable device and/or server based OS. It will be appreciated that the devices, computers, and/or servers illustrated in FIG. 1 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 100 includes a mobile device 102, an update database 114, an application store 160, and a service provider server 134 in communication over a network 150. The mobile device 102, the update database 114, and the service provider server 134 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 100, and/or accessible over network 150.

The mobile device 102 may be implemented as a communication device that may utilize appropriate hardware and software configured for wired and/or wireless communication with the update database 114 and/or service provider server 134. For example, in one embodiment, the mobile device 102 may be implemented as a personal computer (PC), a smart phone, laptop/tablet computer, point-of-sale device, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from Apple®. The mobile device 102 may correspond to and be utilized by a first user. Although only one mobile device 102 is shown, a plurality of mobile devices may function similarly.

The mobile device 102 may include a current version of a service provider application (SPA) 104, other applications 106, a database 108, communication components 110, and sensors 112. The current version of the SPA 104 and other applications 106 may correspond to executable processes, procedures, and/or applications with associated hardware. In other embodiments, mobile device 102 may include additional or different components having specialized hardware and/or software to perform operations associated with the payment applications 104 and/or the other applications 106.

The SPA 104 may be provided and maintained by a service provider associated with the service provider server 134. In certain embodiments, the SPA 104 may correspond to a mobile application downloaded from an application store 160 (e.g., Apple® App Store, Google® Play, Windows® Phone Store, and/or the like). Furthermore, the SPA 104 may facilitate financial transactions, such as payment transactions between users and/or payment transactions corresponding to a sale of goods services provided by a merchant to a user. For example, the SPA 104 may provide an interface to enable a peer-to-peer remittance between a first user of the mobile device 102 and a second user of the second user device 112. In particular, the SPA 104 may communicate with a payment processor (e.g., such as a payment processing application executed by the service provider server 134). The payment processor may transfer a payment amount to be between a first account associated with the first user and a second account associated with the second user. The SPA 104 may also facilitate other types of financial transactions associated with banking, online payments, money transfers, and/or the like.

The mobile device 102 may execute the other applications 106 to perform various other tasks and/or operations corresponding to the mobile device 102. For example, the other applications 106 may include security applications for implementing client-side security features, programmatic client applications for interfacing with appropriate application programming interfaces (APIs) over network 150, or other types of applications. The other applications 106 may also include additional communication applications, such as email, texting, voice, and instant messaging (IM) applications that enable a user to send and receive emails, calls, texts, and other notifications through the network 150. In various embodiments, the other applications 106 may include location detection applications, such as a mapping, compass, and/or global positioning system (GPS) applications, which may be used to determine a location of the mobile device 102. The other applications may 106 include social networking applications. Additionally, the other applications 106 may include device interfaces and other display modules that may receive input and/or output information. For example, the other applications 106 may include a graphical (GUI) configured to provide an interface to the user.

The mobile device 102 may further include a database 108, which may be stored in a memory and/or other storage device of the mobile device 102. The database 108 may include, for example, identifiers (IDs) such as operating system registry entries, cookies associated with the SPA 104 and/or other applications 106, IDs associated with hardware of the communication component 110, IDs used for payment/user/device authentication or identification, and/or other appropriate IDs. The database 108 may also include information corresponding to one or purchase transactions of customers who have purchased goods or services from a merchant, browsing histories of the customers, or other types of customer information. In certain embodiments, the mobile device 102 may also include information corresponding to payment tokens, such as payment tokens generated by the service provider server 134. Further, the database 108 may store login credentials, contact information, biometric information, and/or authentication information.

The mobile device 102 may also include at least one communication component 110 configured to communicate with various other devices such as the second user device 112, and/or the service provider server 134. In various embodiments, communication component 110 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

The mobile device 102 may also include one or more hardware sensors 112 to determine user inputs, motion of the mobile device 102, biometric information associated with a user of the mobile device 102, and/or various environmental data associated with the mobile device 102. The sensors 112 may include, but are not limited to, gyroscopes, cameras, microphones, accelerometers, barometers, thermometers, compasses, magnetometers, light detectors, proximity sensors, fingerprint sensors, pedometers, and heart rate monitors.

The service provider server 134 may be maintained, for example, by a service provider, which may provide payment processing services for the merchant. In one example, the service provider server 134 may be provided by PAYPAL, Inc. of San Jose, Calif., USA. However, in other embodiments, the service provider server 134 may be maintained by or include a financial service provider, social networking service, email or messaging service, media sharing service, and/or other service provider, which may provide payment processing services.

The service provider server 134 includes one or more payment processing applications 136, which may be configured to process payment information received from the mobile device 102. For example, the SPA 104 of the mobile device 102 may receive first account information corresponding to a user of the mobile device in order to transfer payment to a second account corresponding to the second user of the second user device 112. The mobile device 102 may transmit the first account information to the payment processing application 136, which may cause payment to be transferred from the first account to the second account based at least in part on the first account information. As another example, the SPA 104 of the mobile device 102 may receive payment information from a customer to purchase a service or good offered by the merchant. Upon receipt of the payment information, the SPA 104 may transmit the payment information to the service provider server 134. The payment processing application 136 of the service provider server 134 may receive and process the payment information.

The service provider server 134 may also include an update application, which may be executed by the service provider server 134 to facilitate the update of the current version of the SPA 104 stored on the mobile device 102. For instance, the update application 138 may communicate with the update database 114 and access the stored version of the service servicer provider application 116. As described in more detail below, the update application 138 may compare the current version of the SPA 104 with the stored version of the SPA 116 to determine whether an update to the current version of the SPA 104 is warranted and to further determine any new features of the stored version of the SPA 116 that are to be applied to the current version of the SPA 104.

The service provider server 134 may execute the other applications 140 to perform various other tasks and/or operations corresponding to the mobile device 102. For example, the other applications 140 may include security applications for implementing server-side security features, programmatic client applications for interfacing with appropriate application programming interfaces (APIs) over network 150, or other types of applications. The other applications 140 may also include additional communication applications, such as email, texting, voice, and instant messaging (IM) applications that enable a user to send and receive emails, calls, texts, and other notifications through the network 150. In various embodiments, the other applications 140 may include location detection applications, such as a mapping, compass, and/or global positioning system (GPS) applications, which may be used to determine a location of the mobile device 102. The other applications may 140 include social networking applications. Additionally, the other applications 140 may include device interfaces and other display modules that may receive input and/or output information. For example, the other applications 140 may include a GUI configured to provide an interface to the user.

The service provider server 134 may further include a database 142, which may be stored in a memory and/or other storage device of the service provider server 134. The database 142 may include, for example, IDs such as operating system registry entries, cookies associated with the payment processing application 136, biometric information, IDs associated with hardware of the network interface component 146, IDs used for payment/user/device authentication or identification, and/or other appropriate IDs.

In various embodiments, the service provider server 134 also includes at least one network interface component 146 that is configured to communicate with the mobile device 102 and/or the second user device 112 via the network 150. For example, according to a particular embodiment, the service provider server 134 may receive voice communication information from the mobile device 102 and the second user device 112 via the network interface component 146. The network interface component 146 may comprise a DSL modem, a PSTN modem, an Ethernet device, a broadband device, a satellite device and/or various other types of wired and/or wireless network communication devices including microwave, RF, and IR communication devices.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

The update database 114 may be maintained, for example, by the service provider associated with the service provider server 134. As discussed above, the service provider may provide payment processing services for the merchant. For example, the update database 114 may be provided by PAYPAL, Inc. of San Jose, Calif., USA. In other embodiments, the update database 114 may be maintained by or include a financial service provider, social networking service, email or messaging service, media sharing service, and/or other service provider, which may provide payment processing services. In yet other embodiments, the update database 114 may be maintained by a third-party service provider that is different from the service provider associated with the service provider server 134.

The update database 114 may include a stored version of the SPA 116. As described in further detail below, the update database 114 may enable the current version of the SPA 104 to be update to the stored version of the SPA 116 without communicating with the application store 160. To this end, the update database 114 may be configured to communicate, via the network 150, with the mobile device 102 and/or the service provider server 134.

Figure 2:
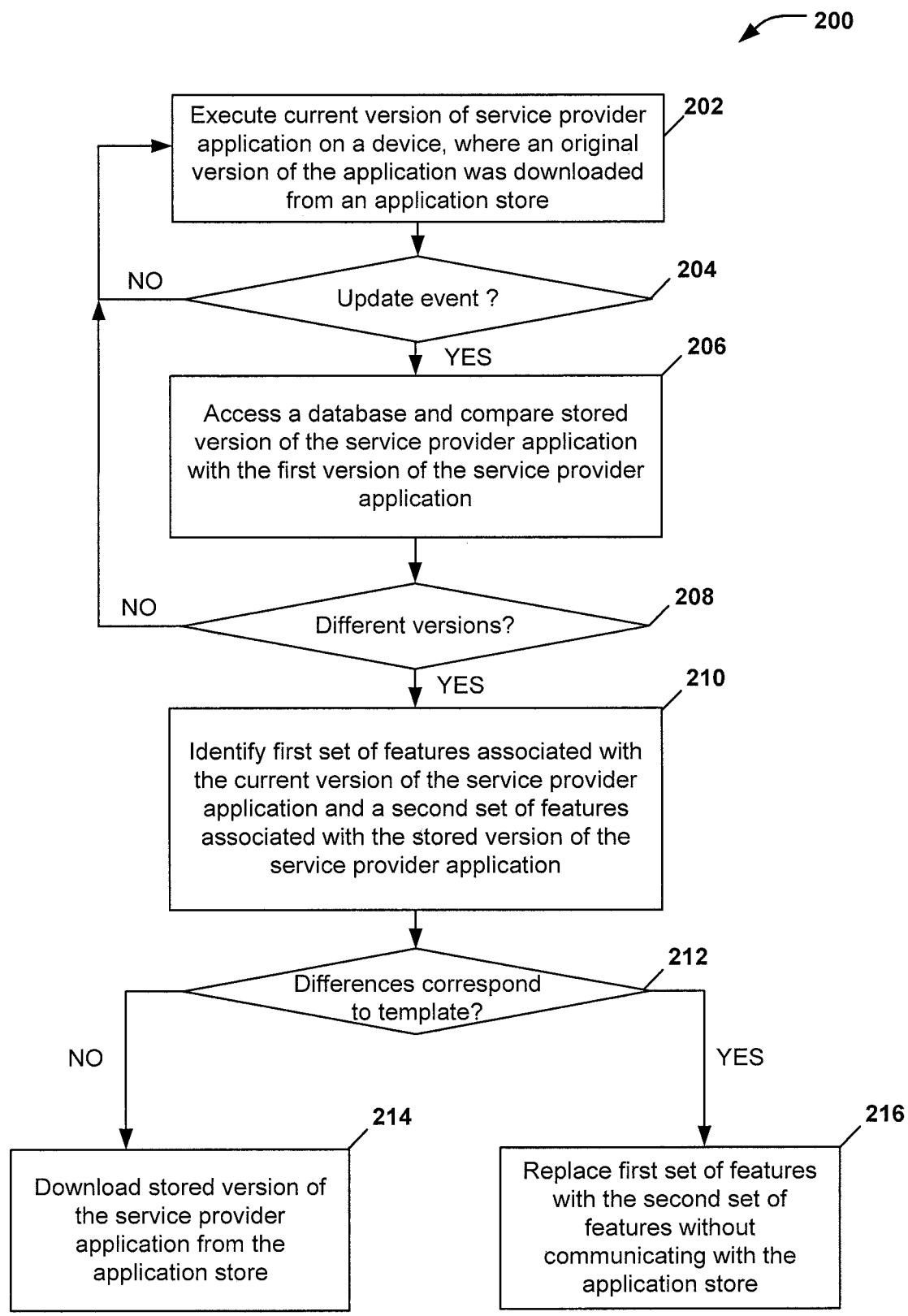
FIG. 2 is an is an example data flow diagram for updating user interface features in an application, according to an embodiment.

Referring now to FIG. 2, a flow diagram depicting a method 200 for updating user interface features in an application is provided in accordance with a particular embodiment. In certain embodiments, the method 200 may be performed by one or more components of the system 100 of FIG. 1, such as the SPA 104 stored on the mobile device 104 or the update application 138 stored on the service provider server 134. Note that one or more steps, processes, and methods described herein may be omitted, performed in a different sequence, or combined as desired or appropriate.

At step 202, the mobile device 102 may execute the current version of the SPA 104. Furthermore, an original version of the SPA may have been downloaded by the mobile device 102 from an application store. In certain embodiments, the original version of the SPA may correspond to the current version of the SPA 104. In other embodiments, the original version of the SPA may have been downloaded from the application store prior to the current version of the SPA 104 being stored and/or executed by the mobile device 102.

At step 204, the mobile device 102 (e.g., the current version of the SPA 104) may determine whether an update event has occurred or has been detected. The update event may refer to an event that causes the current version of the SPA 104 to check for a possible update to the SPA 104. As an example of an update event, a user of the mobile device 102 may make an affirmative selection to update the current version of the SPA 104. The mobile device 102 may receive an input corresponding to the user selection and determine, based on the input, that the current version of the SPA is to be updated. As another example, the current version of the SPA 104 may be configured to periodically check for updates, such as by communicating with the service provider server 134 (e.g., with the update application 138) and/or the update database 114. Each periodic check may correspond to a respective update event. In another example, the SPA 104 an update event may occur in response to the SPA 104 being initialized. For example, upon initialization of the SPA 104 (e.g. executing the SPA 104 after inactivity for a certain period of time), the SPA 104 may perform an API call to the service provider server 134 (e.g., or the update application 138) to perform an update check.

If the no update event has occurred, the current version of the SPA 104 may continue executing on the mobile device 102, as in step 202. If, on the other hand, the SPA 104 detects that an update event has occurred, the method may proceed to step 206. As explained further below, steps 206-208 describe an update check that may be performed to determine whether the current version of the SPA 104 is to be updated. Furthermore, it will be appreciated that while steps 206-212 may be described as being performed by the current version of the SPA 104, the actions and/or elements included in steps 206-212 may also be performed by the service provider server 134, such as by the update application 138.

At step 206, the update check may be performed by accessing the update database 114 and comparing the stored version of the SPA 116 with the current version of the SPA 104 stored on the mobile device 102. Based on the comparison, the SPA 104 may determine, at step 208, whether the current version of the SPA 104 is a different version than the stored version of the SPA 116.

According to one or more embodiments, update database 114 may include multiple stored versions of the SPA, such that each of the multiple stored versions of the SPA 116 may have different corresponding characteristics, such as a different geographical region, a different application type (e.g., whether the application provides services for the merchant or the client), a different language, or other characteristics or a combination thereof. Similarly, the current version of the SPA 104 may be associated with certain characteristics that may indicate the SPA's 104 geographic region, application type, language, and/or the like. Thus, the appropriate stored version of the SPA 116 may be identified from the multiple stored versions of the SPA such that the characteristics of the stored version of the SPA 116 matches characteristics associated with the current version of the SPA 104. Such characteristics may be stored as metadata or other types of information associated with the different versions of the SPA. Further, the identification of the appropriate stored version of the SPA 116 may be performed prior to comparing the stored version of the SPA 116 with the current version of the SPA 104.

Additionally, comparing the stored version of the SPA 116 with the current version of the SPA 104 may include comparing respective structure metadata of the stored version of the SPA 116 and the current version of the SPA 104. For instance, the current version of the SPA 104 may correspond to first structure metadata, and the stored version of the SPA 116 may correspond to second structure metadata. If the first structure metadata is different from the second structure metadata, then the SPA 104 determines that the current version of the SPA 104 is different from the stored version of the SPA 116.

According to another particular embodiment, comparing the stored version of the SPA 116 with the current version of the SPA 104 may include comparing respective validation values associated with the stored version of the SPA 116 and the current version of the SPA 104. For example, a first validation value (e.g., a first checksum value, hash value, version number, and/or the like) may be associated with the current version of the SPA 104, and a second validation value (e.g., a second checksum value, hash value, version number, and/or the like) may be associated with the stored version of the SPA 116. If the first validation value is different from the second validation value, the SPA 104 may determine that the current version of the SPA 104 is different from the stored version of the SPA 116.

According another particular embodiment, comparing the stored version of the SPA 116 with the current version of the SPA 104 may include comparing respective features associated with the stored version of the SPA 116 and the current version of the SPA 104. For example, a first set of features may be associated with the current version of the SPA 104, and a second set of features may be associated with the stored version of the SPA 116. If the first set of features is different from the second set of features, the SPA 104 may determine that the current version of the SPA 104 is different from the stored version of the SPA 116.

It will be appreciated that the above examples with respect to comparing the stored version of the SPA 116 with the current version of the SPA 104 are non-limiting, and that other ways of performing the comparison are also contemplated. Furthermore, the comparison may be performed using any combination of the above described examples.

Referring back to step 208, if the SPA 104 determines that no difference exists between the current version of the SPA 104 and the stored version of the SPA 116 (e.g., the current version of the SPA 104 and the stored version of the SPA 16 are the same version of the SPA), the current version of the SPA 104 may continue executing on the mobile device in step 202.

If the SPA 104 determines that it is different from the stored version of the SPA 116, the method 400 may proceed to step 210. At step 210, the SPA 104 may identify, such as based on the first structure metadata, a first set of features associated with the current version of the SPA 104. The SPA 104 may also identify, such as based on the second structure metadata, a second set of features associated with the stored version of the SPA 106. In certain instances, the first set of features and the second set of features may have already been identified, as discussed above with respect to the comparison(s) performed in steps 206 and 208.

At step 212, the SPA 104 may determine whether the differences between the first set of features and the second set features corresponds to any of one or more predefined interface templates. For example, the SPA 104 may determine new structure metadata based on the differences between the first structure metadata and the second structure metadata. As such, the SPA 104 may determine whether the new structure metadata corresponds to a predefined interface template. As previously discussed, the SPA 104 may include an interpreter to perform the determination of whether the new structure metadata corresponds to the predefined interface template. Also, as previously discussed, the predefine interface templates may specify various UI elements including, but not limited to, input elements, display elements, display element layouts, and/or other types of UI characteristics. In certain implementations, the predefined interface templates may include display elements that correspond to legal notices that are displayed to the user during execution of the SPA. In other implementations, predefined interface templates may include display characteristics of buttons, radials, banners, colors, and/or other types of UI elements. If the SPA 104 determines that the differences between the first set of features and the second set features do not correspond to any of the predefined interface templates, the method may proceed to step 214.

At step 214, the entire stored version of the SPA may be downloaded from the application store. As such, the differences between the first set of features and the second set of features may be too large, or the differences be otherwise be incompatible with being applied to the current version of the SPA without communicating with the application store.

If the SPA 104 determines that the differences between the first set of features and the second set features correspond to at least one of the predefined interface templates, the method may proceed to step 216. At step 216, the first set of features associated with the current version of the SPA 104 may be replaced with the second set of features associated with the stored version of the SPA 116 without communicating with the application store. To this end, various implementations may be used to replace the first set of features with the second set of features, as will be described in more detail below with respect to FIG. 3 and FIG. 4. Further, subsequent to replacing the first set of features with the second set of features, the mobile device 102 may be configured to execute the current version of the SPA 104 using the second set of features.

According to a particular embodiment, updating the current version of the SPA 104 may include updating a legal notice associated with the SPA 104. For example, the first set of features may include a first legal notice display element. The first legal notice display element may correspond to a particular geographical region. Further, the second set of features may include a second legal notice display element that corresponds to the particular geographical region. The second legal notice display element may represent a change to legal language included in the first legal notice display element. The change in the language may correspond to one or more changes in various laws, regulations, business practices, and/or business or legal concerns.

According to other embodiments, differences between the first set of features and the second set of features may represent various other changes to the characteristics of the current version of the SPA 104. For example, the second set of features may represent changes in display element layouts, colors, shapes, forms, and/or the like.

According to another particular embodiment, updating the current version of the SPA 104 may include changing a version number associated with the current version of the SPA 104. For instance, before the update, the current version of the SPA 104 may be associated with a first version number, and the stored version of the SPA 116 may be associated with a second version, number. Upon updating the current version of the SPA 104 to the store version of the SPA 116, the first version number may be changed to the second version number. The changed version number may provide a reference point for potential future updates to the SPA stored on the mobile device 102.

Thus, as a result of the method 200, the current version of the SPA 104 may be updated to the stored version of the SPA 116 without communicating with the application store. Further, the current version of the SPA 104 may be updated without having to download the entire stored version of the SPA 116, or any other version of the SPA in its entirety, from the application store. The method 200 may enable the service provider to bypass various inefficient rules and restrictions that are imposed by the application store. For example, if an update to the current version of the SPA 104 involves a relatively small amount of changes to features (e.g., changing language in a legal notice display element, adjusting layouts, modifying display element colors and shapes, etc.), such changes can be applied to the current version of the SPA 104 without being subject to the restrictions and/or other inefficiencies associated with the application store.

Further, by downloading only certain features that are to be updated rather than downloading an entire new version of the SPA, the mobile device 102 may reduce its bandwidth usage. The reduced bandwidth usage may correspond to a reduction in CPU cycles used by the mobile device 102, which may in turn result in a reduction of the overall power consumption of the mobile device during an update of the current version of the SPA 104. Thus, battery power associated with the mobile device 102 may be conserved, thereby enabling prolonged use of the mobile device 102.

Thus, the method 200 enables the current version of the SPA 104 to be updated more quickly and efficiently than updating the current version of the SPA 104 through the application store. Further, it will be appreciated that the method 200 may be performed for updating the current version of the SPA 102 according to any scenario, whether the current version of the SPA 102 was previously downloaded from the application store or updated without communicating with the application store using the methods described herein.

Figure 3:
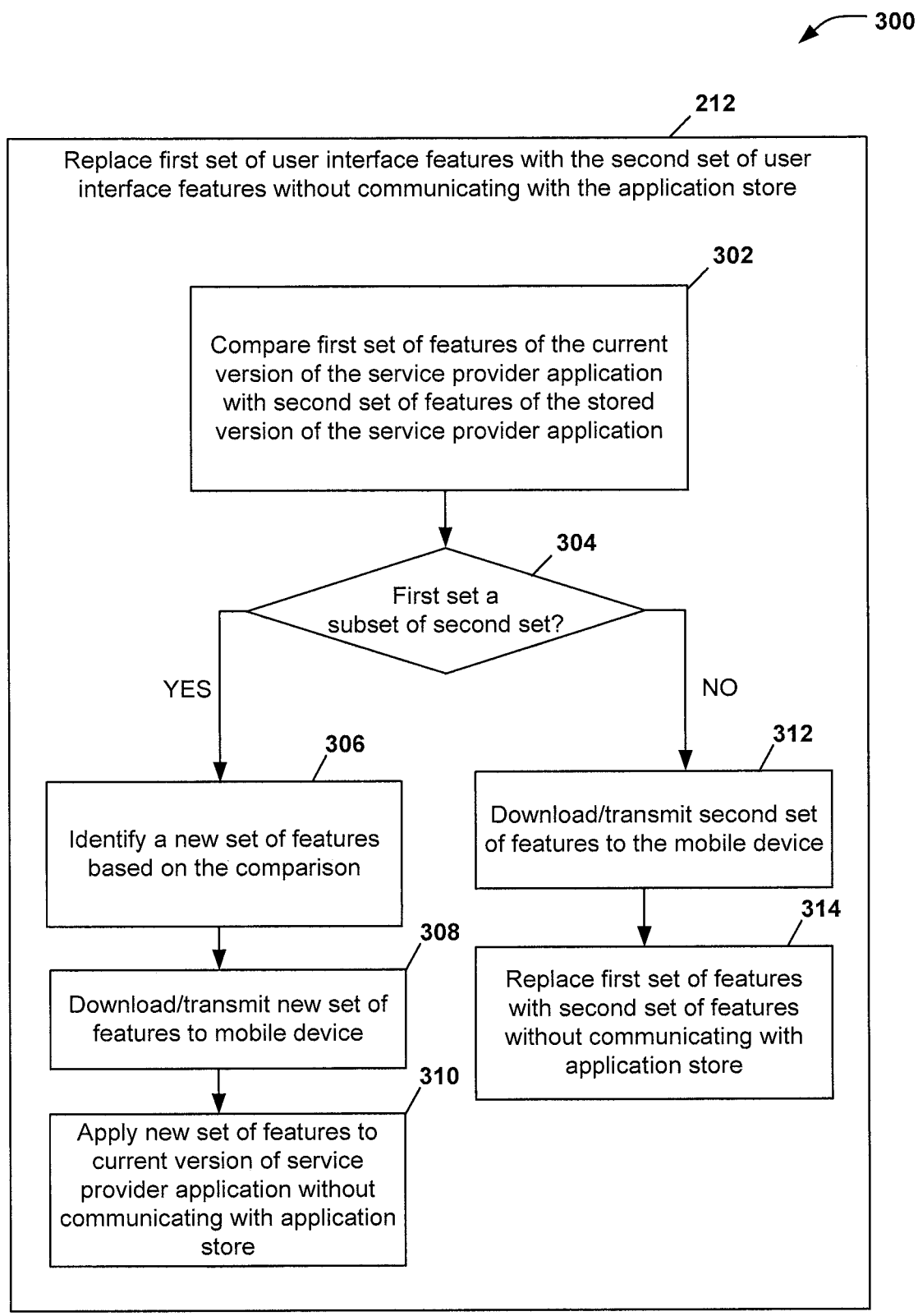
FIG. 3 is an example data flow diagram for replacing certain user interface features with other user interface features, according to another embodiment.

FIG. 3 illustrates a flow diagram of a method 300 for performing step 212 of the method 200 of FIG. 2 (i.e., replacing the first set of features with the second set of features without communicating with the application store).

It will be appreciated that while method 300 may be described as being performed by the current version of the SPA 104, in other embodiments, the service provider server 134 (e.g., the update application 138) may perform some or all of the steps of method 300. Further, in certain embodiments, both the current version of the SPA 104 and the update application 138 may perform some or all of the steps of method 300 in any combination. Note that one or more steps, processes, and methods described herein may be omitted, performed in a different sequence, or combined as desired or appropriate.

At step 302, the SPA 104 may compare the first set of features with the second set of features. As discussed above, the first set of features may correspond to the current version of the SPA 104 being executed by the mobile device 102, and the second set of features may correspond to the stored version of the SPA 116 stored in the update database 114. At step 304, the current version of the SPA 104 may determine whether the first set of features is a subset of the second set of features. If the SPA 104 determines that the first set of features is a subset of the second set of features, the method 300 may proceed to step 306.

Figure 5A:
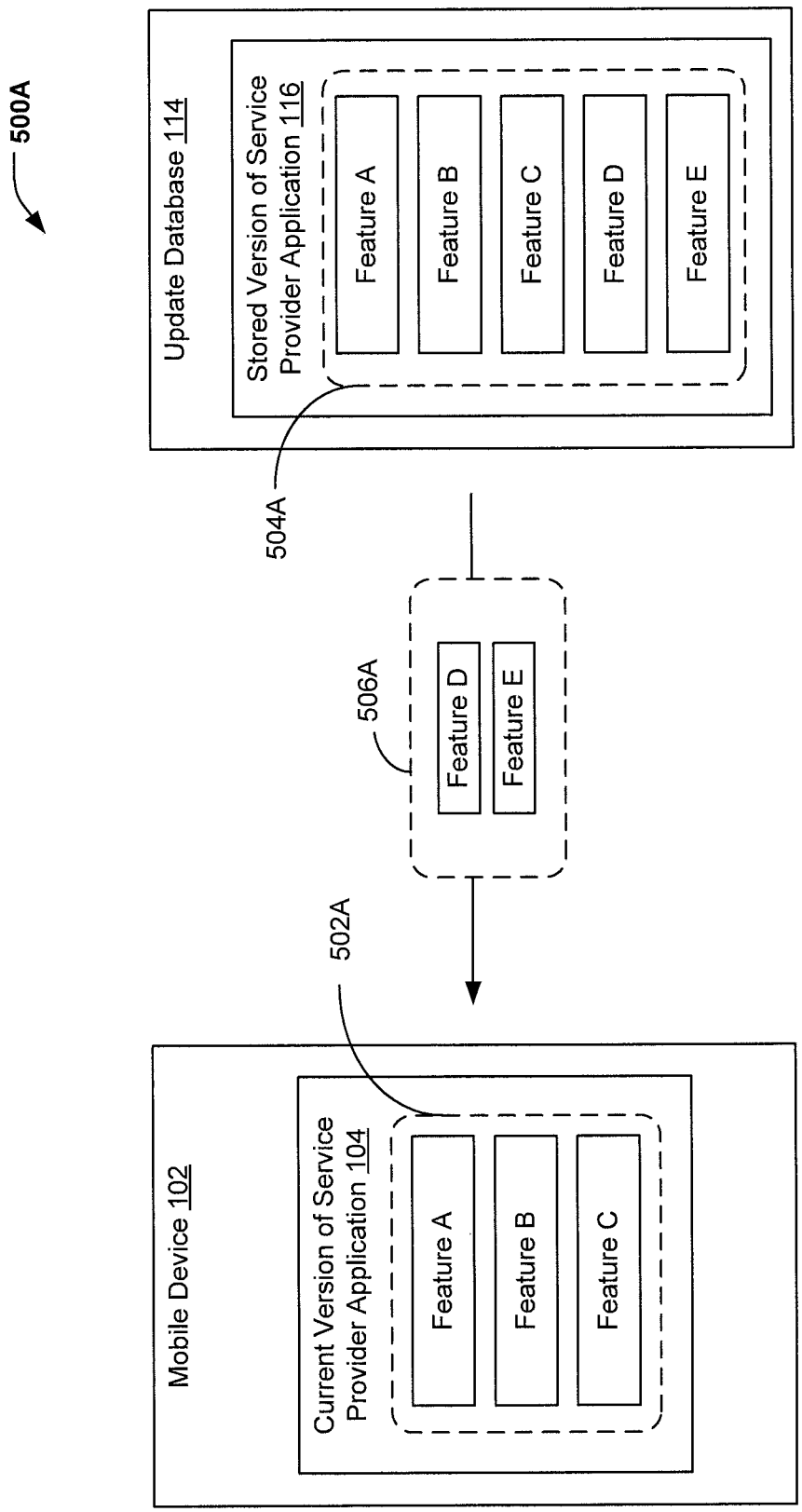
FIG. 5A is block diagram of different sets of user interface features, according to another particular embodiment.

Steps 306, 308, and 310 are described with reference to FIG. 5A. At step 306, the SPA 104 may identify a new set of features based on the comparison of the first set of features with the second set of features. The new set of features may correspond to features that are included in the second set of features but not included in the first set of features. For example, as shown in FIG. 5A, the first set of features 502A may include feature A, feature B, and feature C. The second set of features 504A may include feature A, feature B, feature C, feature D, and feature E. Thus, the first set of features 502A may be a subset of the second set of features 502B. Further, the new set of features 506A includes feature D and feature E. As shown in FIG. 5A, feature D and feature E are included in the second set of features 504A, but not included in the first set of features 502A.

At step 308, the new set of features may be downloaded and/or transmitted to the mobile device 102. For instance, as shown in FIG. 5A, the new set of features 506A may be downloaded to the mobile device 102 from the update database 114. At step 310, the new set of features may be applied to the current version of the SPA 104 without communicating with the application store. As used herein, "applying" a particular feature to the current version of the SPA 104 may include modifying the current version of the SPA 104 such that the current version of the SPA 104 includes the particular feature.

Furthermore, it will be appreciated that in certain embodiments, the SPA 104 may download the new set of features directly from the update database 114. In other embodiments, the update application 138 of the service provider server 134 may access to the update database 114, determine the new set of features, and transmit the second set of features (or a copy thereof) to the mobile device 102.

According to other particular embodiments, if the SPA 104 determines that the first set of features is not a subset of the second set of features, the method 300 may proceed to step 312. Step 312 and step 314 are described with reference to FIG. 5B. At step 312, the second set of features may be downloaded and/or transmitted to the mobile device 102. Further, at step 314, the first set of features may be replaced with the second set of features without communicating with the application store.

Figure 5B:
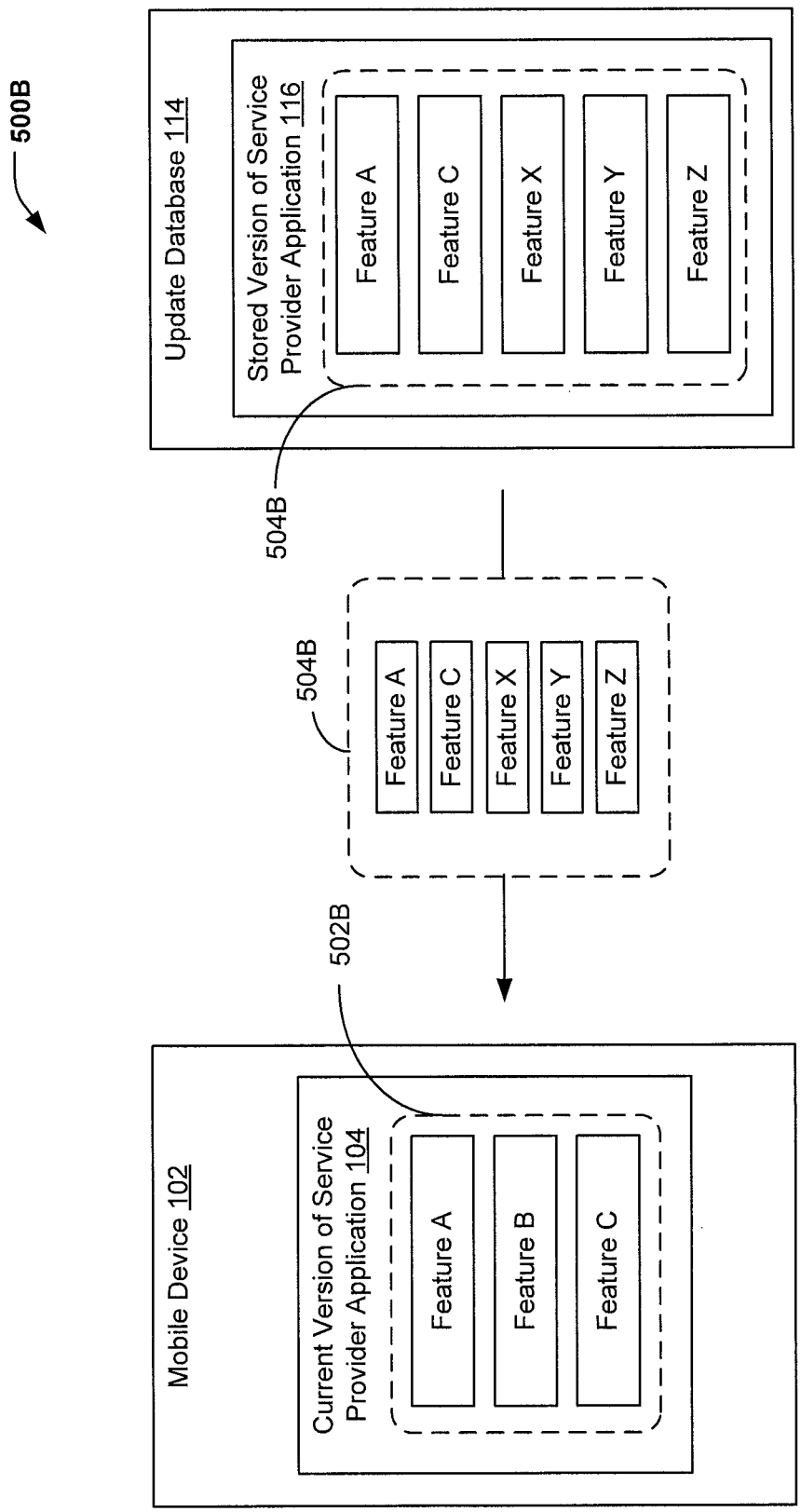
FIG. 5B is block diagram of different sets of user interface features, according to another particular embodiment.

For instance, as shown in FIG. 5B, the first set of features 502B may include feature A, feature B, and feature C. The second set of features 504B may include feature A, feature C, feature X, feature Y, and feature Z. Thus, according to the particular embodiment illustrated in FIG. 5B, the first set of features 502B is not a subset of the second set of features 504B. Further, since the first set of features 502B is not a subset of the second set of features 504B, the second set of features 504B is downloaded to the mobile device from the update database 114. Further, the SPA 104 of the mobile device 102 is configured to replace the first set of features 502B with the downloaded second set of features 504B.

It will be appreciated that in certain embodiments, the SPA 104 may download the second set of features directly from the update database 114. In other embodiments, the update application 138 of the service provider server 134 may access to the update database 114, determine the second set of features, and transmit the second set of (or a copy thereof) features to the mobile device 102.

Figure 4:
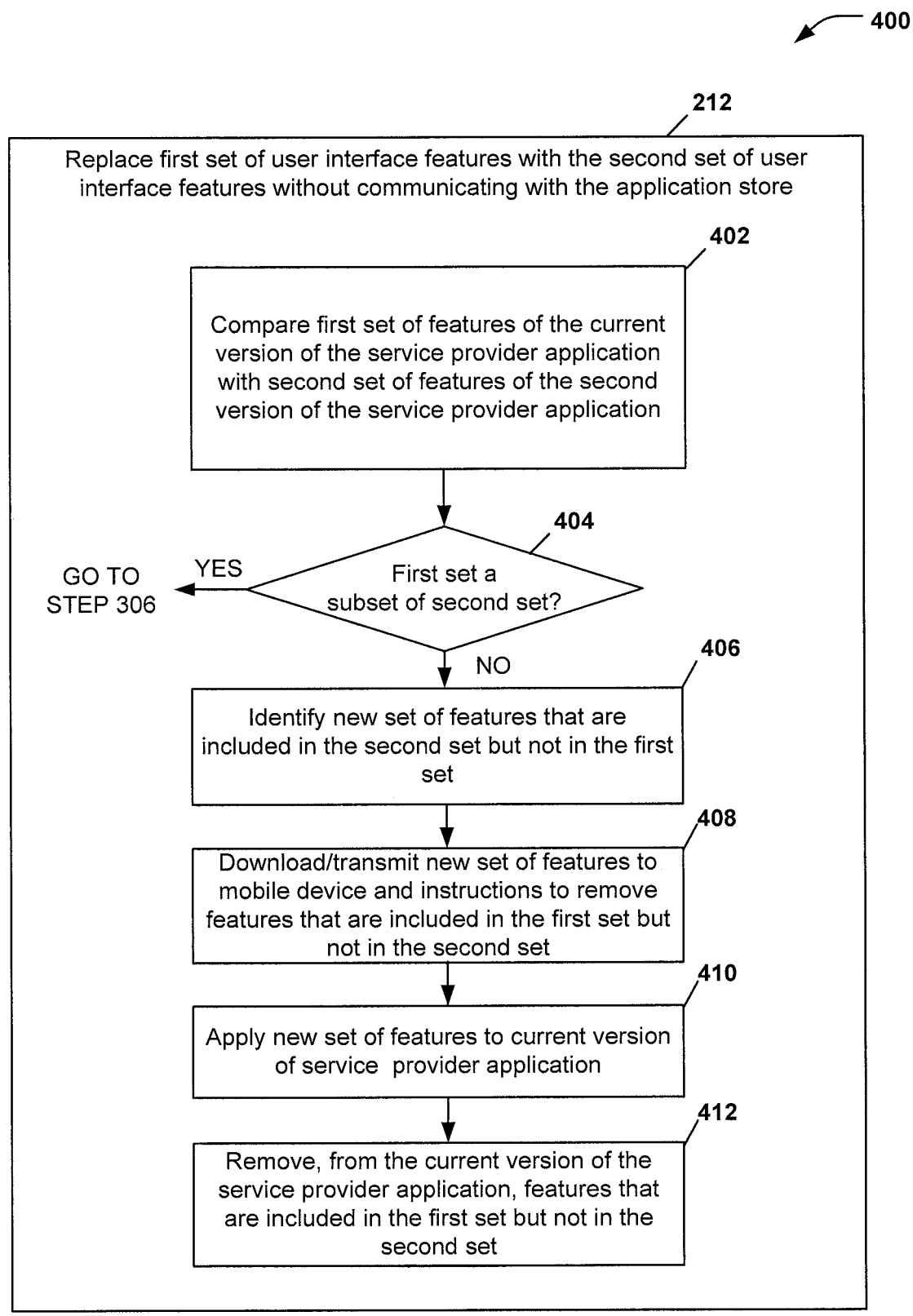
FIG. 4 is an example process flowchart for replacing certain user interface features with other user interface features, according to an embodiment.

Referring now to FIG. 4, a flow diagram of another method 400 for performing step 212 of the method 200 of FIG. 2 (i.e., replacing the first set of features with the second set of features without communicating with the application store) is provided in accordance with a particular embodiment. It will be appreciated that while method 400 may be described as being performed by the current version of the SPA 104, in other embodiments, the service provider server 134 (e.g., the update application 138) may perform some or all of the steps of method 400. Further, in certain embodiments, both the current version of the SPA 104 and the update application 138 may perform some or all of the steps of method 400 in any combination. Note that one or more steps, processes, and methods described herein may be omitted, performed in a different sequence, or combined as desired or appropriate.

Step 402 and step 404 may be similar to step 302 and 304, respectively, of FIG. 3. At step 402, the SPA 104 may compare the first set of features with the second set of features. As discussed above, the first set of features may correspond to the current version of the SPA 104 stored on the mobile device 102, and the second set of features may correspond to the stored version of the SPA 116 stored in the update database 114. At step 404, the current version of the SPA 104 may determine whether the first set of features is a subset of the second set of features. If the SPA 104 determines that the first set of features is a subset of the second set of features, the method 400 may proceed to step 306 of FIG. 3.

Figure 5C:
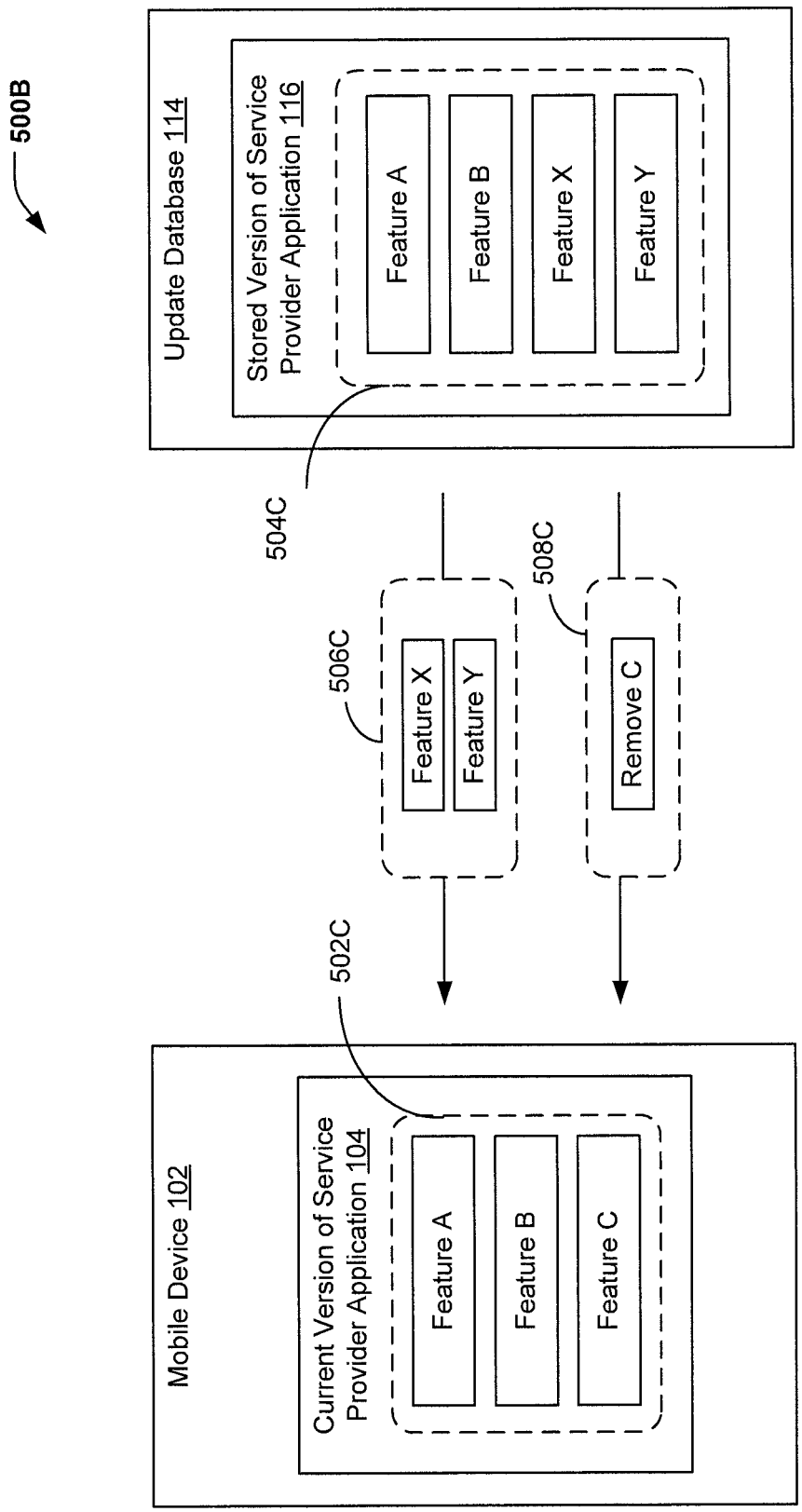
FIG. 5C is block diagram of different sets of user interface features, according to another particular embodiment

If the SPA 104 determines that the first set of features is not a subset of the second set of features, the method 400 may proceed to step 406. Steps 406-412 are described with reference to FIG. 5C. At step 406, the SPA 104 may identify a new set of features. The new set of features includes features that are included in the second subset of features but not included in the first set of features. For example, according to the particular embodiment illustrated in FIG. 5C, the first set of features 502C may include feature A, feature B, and feature C. The second set of features 504C may include feature A, feature B, feature X, and feature Y. Further, the new set of features 506C may include feature X and feature Y.

At step 408, the new set of features may be downloaded and/or transmitted to the mobile device 102. Additionally, removal instructions may also be downloaded and/or transmitted to the mobile device 102. The removal instructions may include instructions to remove (from the current version of the SPA 104) features that are included in the first set of features but not included in the second set of features. For example, as depicted in FIG. 5 C, the new set of features 506C is downloaded from the update database 114 and transmitted to the mobile device 102. Further, removal instructions 508C, which may include instructions to remove feature C from the current version of the SPA 104, is also be transmitted to the mobile device 102.

At step 410, the new set of features may be applied to the current version of the SPA 104. At step 412, features that are included in the first set of features but not included in the second set of features may be removed from the current version of the SPA 104. Such features may be removed from the current version of the SPA 104 subsequent to the mobile device receiving the removal instructions 508C.

In certain implementations, removal instructions may not be transmitted to the mobile device 102. Instead, subsequent to the mobile device 102 receiving the new set of features, the SPA 104 itself may identify the features that are included in the first set of features but not included in the second set of features. The SPA 104 may then remove the identified features.

Figure 6:
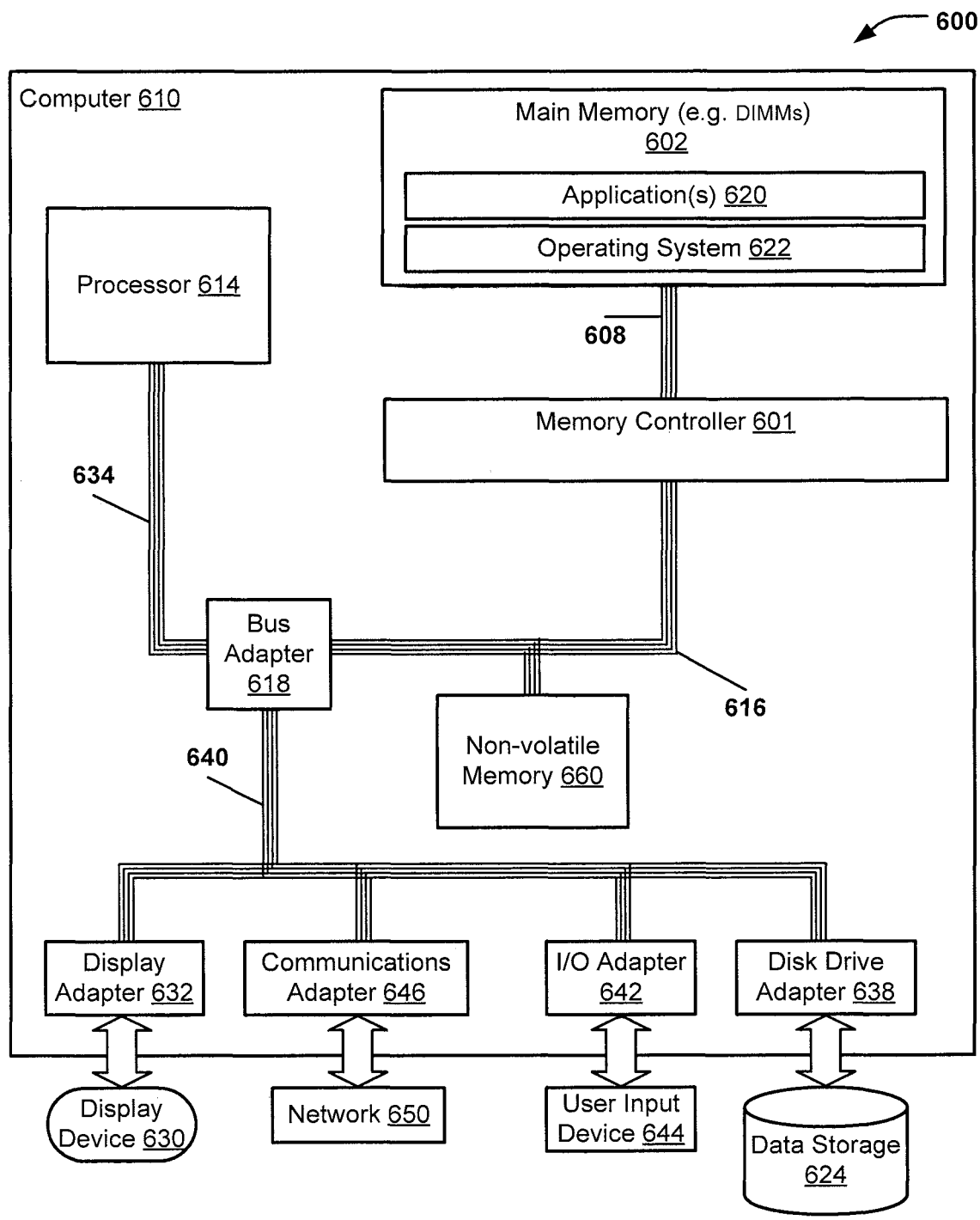
FIG. 6 is a block diagram of a computer system suitable for implementing one or more components in FIG. 1, according to an embodiment.

FIG. 6 is a block diagram of a computer system 600 suitable for implementing one or more components in FIG. 1, according to an embodiment. Referring to FIG. 6, an illustrative system 600 including a computer 610 is shown. The computer 610 may be an implementation of a computing system that includes or corresponds to the mobile device 102, the update database 114, the application store 160, and/or service provider server 134 of FIG. 1. The computer 610 includes at least one computer processor (CPU) 614 (e.g., a hardware processor) as well as main memory 602, a memory controller 601, and a non-volatile memory 660. The main memory 602 is connected through a memory bus 608 to the memory controller 601. The memory controller 601 and the non-volatile memory 660 are connected through a second memory bus 616 and a bus adapter 618 to the processor 614 through a processor bus 634.

Stored at the memory 602 are one or more applications 620 that may be module(s) or computer program instructions for carrying out particular tasks (e.g., the current version of the SPA 104, the stored version of the SPA 116, web browsers, payment processing application 136, update application 138, of FIG. 1). Also stored at the main memory 602 is an operating system 622. Operating systems include, but are not limited to, UNIX® (a registered trademark of The Open Group), Linux® (a registered trademark of Linus Torvalds), Windows® (a registered trademark of Microsoft Corporation, Redmond, Wash., United States), and others as will occur to those of skill in the art. The operating system 622 and the application 620 in the example of FIG. 5 are shown in the main memory 602, but components of the aforementioned software may also, or in addition, be stored at non-volatile memory (e.g., on data storage, such as data storage 624 and/or the non-volatile memory 660).

The computer 610 includes a disk drive adapter 638 coupled through an expansion bus 640 and the bus adapter 618 to the processor 614 and other components of the computer 610. The disk drive adapter 638 connects non-volatile data storage to the computer 610 in the form of the data storage 624 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art. In a particular embodiment, the data storage 624 may store the data and information described herein.

The computer 610 also includes one or more input/output ("I/O") adapters 642 that implement user-oriented input/output through, for example, software drivers and computer hardware for controlling input and output to and from user input devices 644, such as keyboards and mice. In addition, the computer 610 includes a communications adapter 646 for data communications with a data communications network 660. The data communications may be carried out serially through Recommended Standard 232 (RS-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 646 implements the hardware level of data communications through which one computer sends data communications to another computer, directly or through a data communications network. Examples of the communications adapter 646 suitable to use in the computer 610 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer 610 also includes a display adapter 632 that facilitates data communication between the bus adapter 618 and a display device 630, enabling the application 620 to visually present output on the display device 630.

In various embodiments of the present disclosure, execution of instruction sequences to practice the present disclosure may be performed by computer system 600. In various other embodiments of the present disclosure, a plurality of computer systems 600 coupled by communications adapter 646 to the network (e.g., such as a LAN, WLAN, and/or various other wired or wireless networks, including telecommunications, mobile, and cellular phone networks) may perform instruction sequences to practice the present disclosure in coordination with one another.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium or storage device and executed by a processor that includes but is not limited to firmware, resident software, microcode, etc.

Further, embodiments of the present disclosure, may take the form of a computer program product accessible from a computer-usable or computer-readable storage device providing program code (e.g., computer-executable instructions) for use by or in connection with a computer, processor, or any instruction execution system. For the purposes of this description, a computer-usable or computer-readable storage device may be non-transitory and can be any apparatus that can tangibly embody a computer program and that can contain, store, communicate, propagate, or transport the program for use by or in connection with the instruction execution system, processor, apparatus, or device.

In various embodiments, the medium can include an electronic, magnetic, optical, electromagnetic, infrared, or semiconductor system (or apparatus or device) or a propagation medium. Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A device, comprising:
   non-transitory memory storing computer-executable instructions; and
   one or more hardware processors configured to execute the computer-executable instructions to cause the device to perform operations comprising:
     receiving an update event corresponding to a first version of a service provider application, wherein the update event comprises a first hash value stored by the device with the first version;
     accessing a database that stores a plurality of versions of the service provider application, wherein the database is separate from an application store that provided the first version of the service provider application to the device;
     determining that a stored hash value for a second version of the service provider application from the plurality of versions of the service provider application is different from the first hash value stored by the device, wherein the stored hash value is stored with the second version;
     in response to the stored hash value being different from the first hash value, determining, from the database without accessing the application store, matching application characteristics between the first version and the second version of the service provider application from the plurality of versions of the service provider application;
     retrieving, from the database based on the stored hash value without accessing the application store, removal instructions associated with modular features of the first version of the service provider application to update to the second version of the service provider application;

determining, from the database without accessing the application store, a first set of the modular features corresponding to the first version of the service provider application and a second set of the modular features corresponding to the second version of the service provider application based on the removal instructions;

identifying, based on a comparison between the first set of the modular features and the second set of the modular features, a new set of the modular features, wherein the new set of the modular features comprise an interface element of a user interface for a predefined interface template having updated element data within the interface element; and applying the new set of the modular features to the first version of the service provider application, wherein the operations are performed without communicating with the application store.

2. The device of claim 1, wherein the new set of the modular features is not included in the first set of the modular features, and wherein the database and the service provider application are both maintained by a particular service provider.

3. The device of claim 1, wherein the operations further comprise:

comparing first structure metadata associated with the first version of the service provider application and second structure metadata associated with the second version of the service provider application;

determining, based on the comparing, that the first structure metadata is different from the second structure metadata; and in response to determining that the first structure metadata is different from the second structure metadata, determining that an update is to be made to the first version of the service provider application.

4. The device of claim 1, wherein the device stores a first version number associated with the first version of the service provider application, and the operations further comprise:

changing the first version number to a second version number, the second version number associated with the second version of the service provider application.

5. The device of claim 1, wherein the applying the new set of the modular features is based on determining that new set of the modular features corresponds to a predefined interface template for the user interface.

6. The device of claim 1, wherein the operations further comprise:

determining that a third version of the service provider application is to be updated to a fourth version of the service provider application;

identifying, based on a comparison between the third version of the service provider application and the fourth version of the service provider application, a second new set of modular features; and in response to determining that the second new set of modular features does not correspond to a predefined interface template for the user interface, downloading the fourth version of the service provider application to replace the third version of the service provider application.

7. The device of claim 6, wherein:

the third version of the service provider application and the fourth version of the service provider application are later versions of the service provider application than the second version of the service provider application; or the third version of the service provider application and the fourth version of the service provider application are earlier versions of the service provider application than the first version of the service provider application.

8. The device of claim 1, wherein the first version of the service provider application comprises an original version of the service provider application.

9. The device of claim 1, wherein the first version of the service provider application corresponds to a later version of the service provider application than an original version of the service provider application.

10. A method, comprising:

executing, by a computer comprising one or more hardware processors, a current version of a service provider application, wherein the current version of the service provider application is downloaded from an application store;

determining an update event corresponding to the current version of the service provider application, wherein the update event comprises a first hash value stored by the computer with the current version;

determining that a stored hash value for a stored version of the service provider application from the application store is different from the first hash value stored by the computer, wherein the stored hash value is stored with the stored version;

in response to the stored hash value being different from the first hash value, determining, by the computer from a database without accessing the application store, that the current version of the service provider application is to be updated;

comparing the current version of the service provider application with the stored version of the service provider application that is stored in the database comprising a plurality of versions of the service provider application, wherein the database is separate from the application store, and wherein the comparing comprises:

determining matching application characteristics between the current version and the stored version of the service provider application from the plurality of versions of the service provider application;

retrieving, from the database without accessing the application store, removal instructions associated with modular features of the current version of the service provider application to update to the stored version of the service provider application;

determining, from the database without accessing the application store, that a first set of the modular features corresponding to the current version of the service provider application is different than a second set of the modular features corresponding to the stored version of the service provider application based on the removal instructions, wherein the first set of the modular features comprise an interface element of a user interface for a predefined interface template having updated element data within the interface element; and applying the second set of the modular features to the stored version of the service provider application without communicating with the application store.

11. The method of claim 10, wherein the applying the second set of the modular features comprises:

identifying, without communicating with the application store, a new set of the modular features that are included in the second set of the modular features but not included in the first set of the modular features; and applying, without communicating with the application store, the new set of the modular features to the current version of the service provider application.

12. The method of claim 11, wherein the applying the second set of the modular features further comprises:

removing, without communicating with the application store, one or more features from the current version of the service provider application, wherein one or more features are included in the first set of the modular features but not included in the second set of the modular features.

13. The method of claim 10, wherein an original version of the service provider application corresponds to the current version of the service provider application.

14. The method of claim 10, wherein the current version of the service provider application corresponds to a later version of the service provider application than an original version of the service provider application.

15. The method of claim 10, wherein the comparing the current version of the service provider application with the stored version of the service provider application includes comparing first structure metadata associated with the current version of the service provider application with second structure metadata associated with the stored version of the service provider application.

16. The method of claim 10, wherein the first set of the modular features comprise display elements selected from a group consisting of a legal notice display element and a button layout display element.

17. A non-transitory computer-readable medium having stored thereon computer-executable instructions, that when executed by a system, causes the system to perform operations comprising:

executing a current version of a service provider application that includes a first set of modular features, wherein an original version of the service provider application is downloaded from an application store;

determining an update event corresponding to the current version of the service provider application, wherein the update event comprises a first hash value stored with the current version;

determining that a stored hash value for a stored version of the service provider application from the application store is different from the first hash value stored with the current version, wherein the stored hash value is stored with the stored version;

in response to the stored hash value being different from the first hash value, determining, from a database without accessing the application store, that the current version of the service provider application is to be updated;

comparing the current version of the service provider application with the stored version of the service provider application that is stored in the database comprising a plurality of versions of the service provider application, wherein the database is separate from the application store;

determining matching application characteristics between the current version and the stored version of the service provider application from the plurality of versions of the service provider application;

retrieving, from the database without accessing the application store, removal instructions associated with a second set of the modular features of the current version of the service provider application to update to the stored version of the service provider application, wherein the second set of the modular features comprise an interface element of a user interface for a predefined interface template having updated element data within the interface element; and applying the second set of the modular features to the stored version of the service provider application, wherein the operations are performed without communicating with the application store.

18. The non-transitory computer-readable medium of claim 17, wherein the applying the second set of the modular features comprises:

identifying, without communicating with the application store, a new set of the modular features that are included in the second set of the modular features but not included in the first set of the modular features; and applying, without communicating with the application store, the new set of the modular features to the current version of the service provider application.

19. The non-transitory computer-readable medium of claim 17, wherein the comparing the current version of the service provider application with the stored version of the service provider application includes comparing first structure metadata associated with the current version of the service provider application with second structure metadata associated with the stored version of the service provider application.

20. The non-transitory computer-readable medium of claim 17, wherein the operations further comprise determining that the first set of the modular features is different than the second set of the modular features.

* * * * *